(12) United States Patent
Lin et al.

(10) Patent No.: US 6,574,124 B2
(45) Date of Patent: Jun. 3, 2003

(54) PLURAL POWER CONVERTERS WITH INDIVIDUAL CONDITIONED ERROR SIGNALS SHARED ON A CURRENT SHARING BUS

(75) Inventors: Feng Lin, Plano, TX (US); Ning Sun, Plano, TX (US); Hengchun Mao, Plano, TX (US); Yimin Jiang, Plano, TX (US)

(73) Assignee: Netpower Technologies, Inc., Plano, TX (US)

( * ) Notice: Subject to any disclaimer, the term of this patent is extended or adjusted under 35 U.S.C. 154(b) by 0 days.

(21) Appl. No.: 10/242,558

(22) Filed: Sep. 11, 2002

(65) Prior Publication Data

US 2003/0048648 A1 Mar. 13, 2003

Related U.S. Application Data

(60) Provisional application No. 60/318,794, filed on Sep. 13, 2001.

(51) Int. Cl.[7] ............................................. H02M 3/335
(52) U.S. Cl. ............................ 363/65; 363/72; 363/97
(58) Field of Search ............................. 363/65, 71, 72, 363/95, 97; 323/272

(56) References Cited

U.S. PATENT DOCUMENTS

| | | | |
|---|---|---|---|
| 5,122,726 A | * 6/1992 | Elliott et al. | 323/272 |
| 5,157,269 A | * 10/1992 | Jordan et al. | 363/72 |
| 5,191,519 A | * 3/1993 | Kawakami | 363/71 |
| 5,212,630 A | * 5/1993 | Yamamoto et al. | 363/71 |
| 5,303,138 A | 4/1994 | Rozman | |
| 5,521,809 A | 5/1996 | Ashley et al. | |
| 5,631,810 A | 5/1997 | Takano | |
| 5,940,287 A | 8/1999 | Brkovic | |
| 5,952,733 A | 9/1999 | Johnston | |
| 5,956,245 A | * 9/1999 | Rozman | 363/71 |
| 6,134,122 A | * 10/2000 | Chen et al. | 363/97 |
| 6,137,274 A | 10/2000 | Rajagopalan | |
| 6,185,082 B1 | 2/2001 | Yang | |
| 6,188,592 B1 | 2/2001 | Farrington et al. | |
| 6,191,569 B1 | * 2/2001 | Arbetter et al. | 323/272 |
| 6,191,964 B1 | 2/2001 | Boylan et al. | |
| 6,195,275 B1 | 2/2001 | Lu | |
| 6,271,712 B1 | 8/2001 | Ball | |
| 6,344,980 B1 | 2/2002 | Hwang et al. | |
| 6,346,798 B1 | * 2/2002 | Passoni et al. | 323/272 |
| 6,426,612 B1 | 7/2002 | Rozsypal | |
| 6,429,709 B1 | 8/2002 | Hall et al. | |

* cited by examiner

*Primary Examiner*—Jeffrey Sterrett
(74) *Attorney, Agent, or Firm*—Christine Q. McLeod; Beusse, Brownlee, Bowdoin & Wolter (57) ABSTRACT

A power distribution system is provided including current sharing circuitry, current sensing and over-current protection. The system includes a plurality of power converter modules each having a current sharing signal terminal on an input side and power output terminals on an output side, the corresponding power output terminals of the several modules being connected together and adapted to power a common load; an interconnecting signal bus coupled across the current sharing signal terminals on the input side; a plurality of feedback circuits, each of which is associated with one of said modules, each feedback circuit including a comparator (error amplifier) for comparing a feedback voltage on the output side with a reference voltage to provide an error signal to the input side; the error signal conditioned to provide a current command signal to said signal bus, wherein the signal bus provides a common current command signal to drive the power converter modules.

43 Claims, 10 Drawing Sheets

PLURAL POWER CONVERTERS WITH INDIVIDUAL CONDITIONED ERROR SIGNALS SHARED ON A CURRENT SHARING BUS

This application claims the benefit of U.S. patent application Ser. No. 60/318,794 filed on Sep. 13, 2001, incorporated herein by reference.

BACKGROUND OF THE INVENTION

The present invention is generally related to control and operation of power converter devices, and, more particularly, to circuits and techniques for parallel operation of power converters.

Switching-mode power converters are widely used in numerous applications to meet the needs of electronic systems. For example, in the telecom and networking industries, DC/DC converters convert a raw dc voltage (input), usually over a certain variation range, to a dc voltage (output) that meets a set of specifications.

DC/DC converters are commonly paralleled at their outputs either to provide higher output power to a load or to provide redundant operation in high reliability applications where the output must be maintained within specification in the event of a failure of a DC/DC converter. One of the main factors that contribute to effective operation of parallel DC/DC converters is the current sharing mechanism that is implemented in the parallel system. The purpose of this mechanism is to ensure equal distribution of current among the devices.

Various types of circuits for sharing a common load among a plurality of DC/DC converters are known. In a traditional current share scheme, each converter module has a current-share terminal, either at the output or at the input. When converters are in parallel operation, these current-share terminals are tied together. The signal at the current-share terminal tries to maintain an almost equal current in each module, which could be determined by a master-slave mechanism or an average type of mechanism. The master-slave technique may include, for example, a dedicated-master scheme where one module is selected as the master or an automatic-master where the system decides which converter will be chosen as the master depending on which converter has the largest output current.

Feedback loops exist in switching power converters to help the system maintain a constant output voltage. For parallel operation, inside each module, the actual current feedback signal is used to adjust its output voltage reference so that all modules will share the load current. However, if the output voltage reference and the current sharing terminal are located at different sides of the isolation boundary inside the converter, the current-sharing circuit becomes complex since the control signal has to be passed through the isolation boundary. This is especially problematic in standard converter modules, such as half-brick modules, quarter-brick modules, $\frac{1}{8}^{th}$ brick modules etc, where board space is limited.

Accordingly, it would be desirable to provide a simple and effective solution without sending a signal across the isolation boundary.

Figure 1:
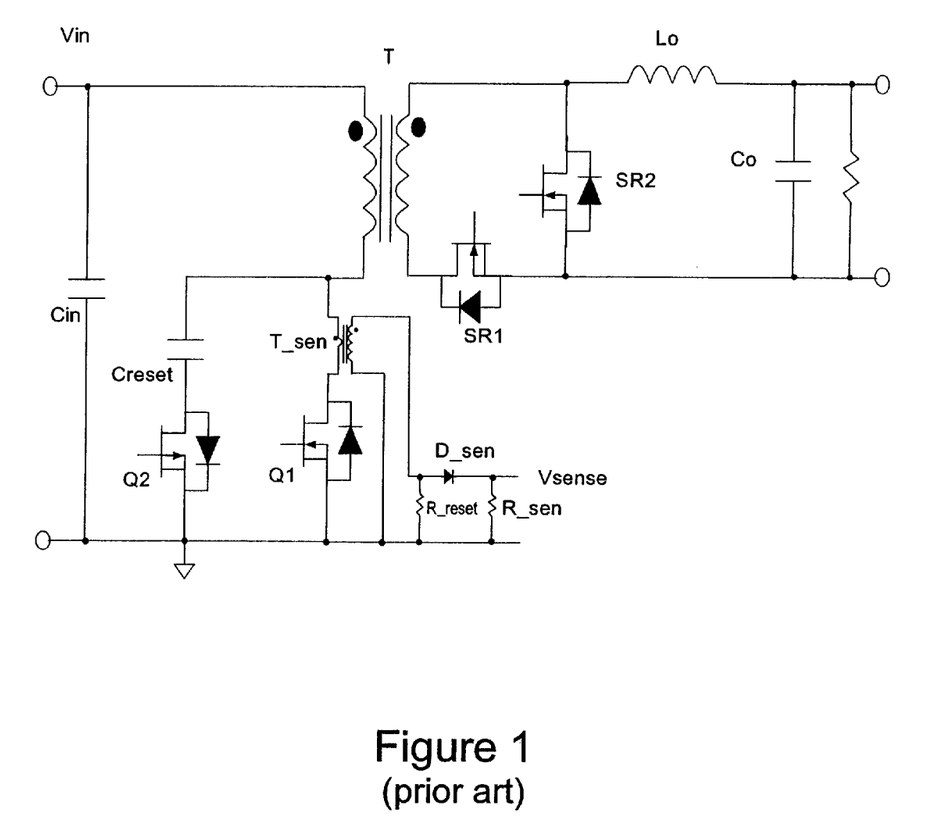
FIG. 1 shows a forward converter with a current sensing transformer.

In addition, for protection and control needs, the output current or the main switch current of the converter needs to be reliably sensed. In power converters, a current sense transformer is usually used to sense the current information in the power switches or in transformer windings, for current mode control and for over-current protection. FIG. 1 shows a forward converter with a current sensing transformer T_sen. The main purpose of T_sen is to produce, from the primary current, a proportional secondary current that can easily be measured or used to control various circuits. The primary winding is connected in series with the source current to be measured, while the secondary winding is normally connected to a meter, relay, or a burden resistor to develop a low level voltage that is used for control purposes. Whenever a current sensing transformer is used, the proper reset of the transformer core under all operating conditions must be ensured, otherwise the saturation of the core could lead to a distorted current information and therefore the control loop and protection will not function properly. The resistance of the reset resistor R_reset is much higher than the resistance of the sensing resistor R_sen so that the small magnetizing current in the sensing transformer can generate enough voltage to reset the core during a fraction of the "OFF" period of the main power switch Q1.

This current sensing scheme assumes the current in Q1 is always positive. However, in reality this current could be negative depending on the magnetizing current in the main transformer T and the output inductor current in Lo. This issue becomes more problematic in a dc/dc converter using synchronous rectification where there is a negative current in Lo under light load or during dynamic process during the "ON" period of the main power switch Q1. Due to the diode D_sen, the negative current reflected to the sensing transformer output will create a high voltage on the resistor R_reset, which in turn causes a high magnetizing current in the sense transformer T_sen. This magnetizing current causes false signal at Vsense, and can bringing the converter into malfunction. This high voltage could also quickly saturate the current sensing transformer core and cause the damage to the converter due to loss of sensed signal. Over-current protection is also important in any dc/dc converter. As the output current reaches a predetermined level, the converter should shut down or enter into a constant power mode to prevent damage to the converter and the loads that it powers.

Accordingly, a simple and reliable current sensing scheme, which also provides over-current protection is desired.

BRIEF SUMMARY OF THE INVENTION

Generally, the present invention fulfills the foregoing needs by providing in one aspect thereof a power distribution system including a plurality of power converter modules each having a current sharing signal terminal on an input side and power output terminals on an output side, the corresponding power output terminals of the several modules being connected together and adapted to power a common load; an interconnecting signal bus coupled across the current sharing signal terminals on the input side; a plurality of feedback circuits, each of which is associated with one of said modules, each feedback circuit including a comparator (output error amplifier) for comparing a feedback voltage on the output side with a reference voltage to provide an error signal to the input side; the error signal conditioned to provide a current command signal to said signal bus, wherein the signal bus provides a common current command signal to drive the power converter modules.

In a specific aspect thereof, the feedback circuits include isolation circuitry to electrically isolate the error signal from the input side in the form of an opto-isolator apparatus. The output error amplifier drives the input of the opto-isolator apparatus. Moreover, the error signal is conditioned by a first buffer (a first operational amplifier) to provide the current command signal to the signal bus. To operate as a master-slave scheme, a diode may be series coupled to the output of the first operational amplifier such that the highest current command signal of all power converter modules is provided to the signal bus.

In a further aspect thereof, a second buffer (a second operational amplifier) is provided to condition the common current command signal from the signal bus prior to driving the power converter module associated with the second buffer. The power converter module is driven by a pulse-width modulated (PWM) controller having the output of the second operational amplifier as an input thereto. The PWM controller may also include a ramp compensation signal input and a current sense input. In another aspect thereof, the second buffer is a compensator that compares the common current command signal from the signal bus with a sensed signal related to output current. The output of the compensator drives the power converter module associated therewith. In a further aspect thereof, the first operational amplifier compares the error signal with a second reference voltage to provide the current command signal provided to the signal bus, wherein the second reference voltage is generated from a bias voltage or a reference voltage from a pulse-width modulated (PWM) controller. Optionally, a time delay (e.g., an R-C circuit) is introduced to the second reference voltage.

The present invention also provides a current share circuit for power converters in parallel operation. The circuit includes an interconnecting signal bus coupled across current sharing signal terminals on an input side of said power converters; a plurality of feedback circuits, each of which is associated with one of said converters, each feedback circuit including a comparator for comparing a feedback voltage on an output side of the power converter with a reference voltage to provide an error signal to the input side; the error signal conditioned to provide a current command signal to said signal bus, wherein the signal bus provides a common current command signal to drive the power converters.

Moreover, a method for current sharing in parallel operated power converters is provided, the method including (a) interconnecting a signal bus across current sharing signal terminals on an input side of said power converters; (b) providing a plurality of feedback circuits, each of which is associated with one of said converters, each feedback circuit including (i) comparing a feedback voltage on an output side of the power converter with a reference voltage to provide an error signal to the input side; (ii) conditioning the error signal to provide a current command signal to said signal bus, and (iii) providing a common current command signal from the signal bus to drive the power converters.

In a further aspect thereof, a current sense circuit for a power converter is provided including a current sense transformer generating a current indicative of the current through the main switch of the power converter; and a transistor synchronized with the main power switch having a first port coupled to the current sense transformer for receiving a voltage that is indicative of the current through the main switch of the power converter and a second port for providing an output voltage across a sense resistor that is indicative of the current through the main switch.

The sensed current can be used for the over-current protection of a power converter. The over-current protection circuit includes a first diode to sample and hold the peak value of the current sense signal; and comparison circuitry capable of comparing said peak value with a reference voltage and developing an over-current protection signal in accordance therewith.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 2:
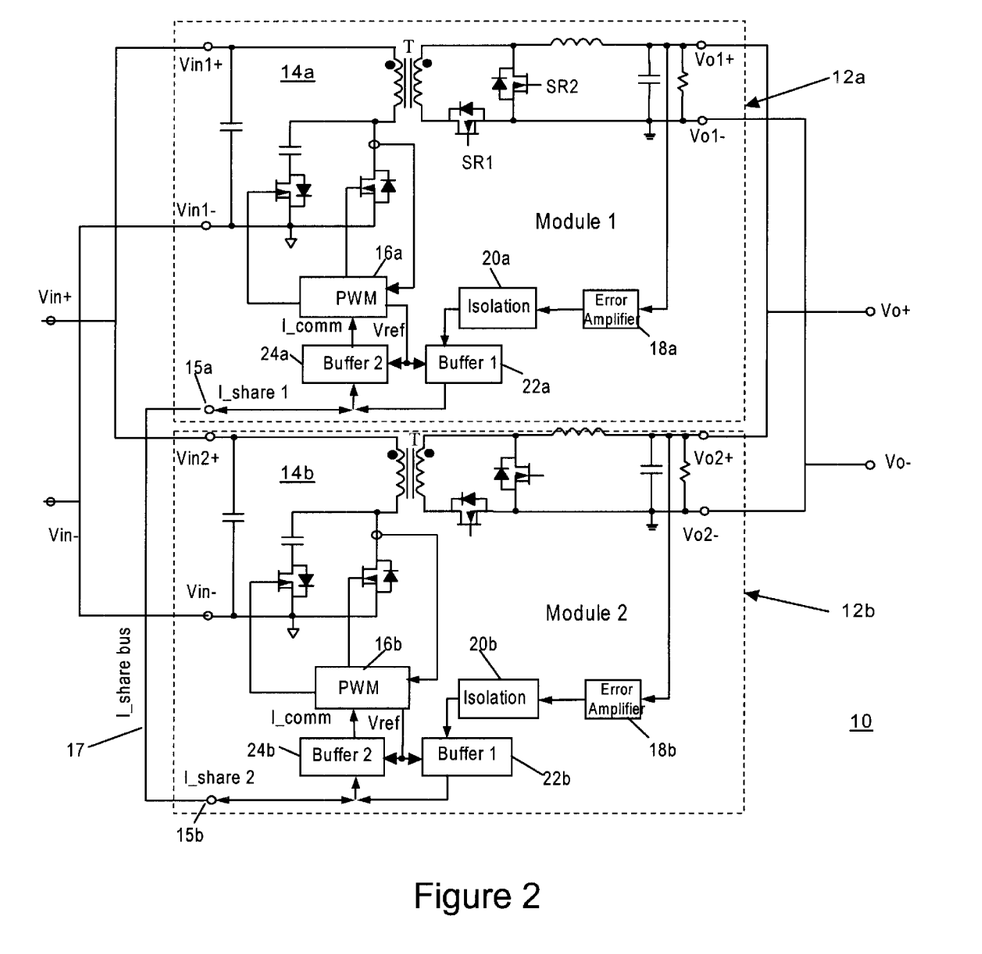
FIG. 2 is a functional block diagram of parallel modules with a current share scheme in accordance with the aspects of the present invention.

FIG. 2 shows the function blocks of two modules 12a and 12b in parallel. The power stages 14a and 14b shown are forward converters. This current-share scheme works for other topologies as well. It is important to note that the invention is not limited to paralleling just two converters 14a and 14b. Additional converters and associated components of appropriate topology can be connected in parallel if desired so as to divide the current supplied to the load among more than two DC/DC converters. For simplicity of discussion however, the drawings and the remainder of this description are limited to the case where only two forward converters 14a and 14b, are paralleled. From this description, it will be apparent to those skilled in the art how additional converters can be added in a similar manner. Each power stage may include a DC/DC converter and a respective control circuit. Multiple DC/DC converters may be connected in parallel to meet increased current demands of a load. With increased current demand, additional converters can be added as needed.

Figure 3:
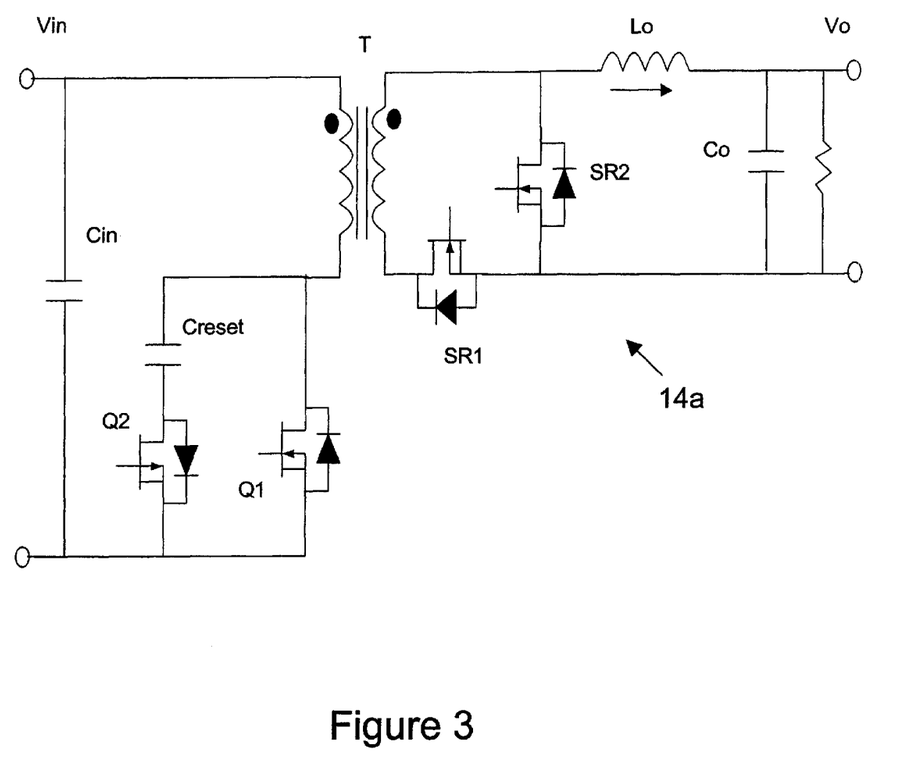
FIG. 3 shows a simplified circuit diagram of a forward converter.

Turning to FIG. 3, a brief overview of the operation of forward converter 14a is presented to facilitate an understanding of the present invention, the operation of forward converter 14b being identical. In operation, a DC voltage input Vin1 is connected to the primary winding of the power transformer T by a power switch Q1. A clamp circuit arrangement is also provided to limit the reset voltage. The power switch Q1 is shunted by a series connection of a clamp capacitor Creset and a switch device Q2. The conducting intervals of Q1 and Q2 are mutually exclusive with certain time delay between them.

The secondary winding is connected to an output circuit through a synchronous rectifier circuit including rectifying devices SR1 and SR2. With the power switch Q1 conducting, the input voltage is applied across the primary winding. The secondary winding is oriented in polarity to respond to the primary voltage with a current flow through inductor Lo, the load connected to the output lead and back through the rectifier device SR1 to the secondary winding. Continuity of the current flow in the inductor Lo when the power switch Q1 is non-conducting is maintained by the current path provided by the conduction of the rectifier device SR2. An output filter capacitor Co shunts the output of the converter. The output of a PWM controller provides a PWM drive signal to switch Q1 and switch Q2.

With reference to FIG. 2, forward converters 14a and 14b configured according to the present invention, are connected mutually in parallel at their output terminals Vo+ and Vo− across a common load (not shown). The respective input terminals Vin+ and Vin− of converters 14a and 14b are connected across a common DC source. "I_share 1" and "I_share 2" are the respective current share terminals 15a and 15b for parallel operation of multiple modules 12a and 12b. The respective I_share terminals 15a and 15b are connected via I_sharebus 17.

Feedback loops are provided in each module to help the system maintain a constant output voltage. Referring to module 12a, module 12b being configured in the same manner, an output error amplifier 18a compares the feedback output voltage Vo with a reference voltage Vo_ref so that the output of the error amplifier 18a is a current command signal. This signal goes through an isolation block 20a to the primary side where it is coupled to a first buffer 22a. The output of buffer 22a is a current command related signal available to its I_share terminal 15a.

A conditioning circuit such as peak detect diode circuit can be also be included in buffer 22a to allow the I_share terminal to pick the highest, the lowest or a weighted average of the current command related signals from all paralleled modules.

This common signal at the I_share terminal 15a is then coupled to a second buffer 24a in module 12a (as is in all the paralleled modules). The output of the second buffer 24a is conditioned so that it can serve as the current command signal I_comm to the PWM controller 16a. Different PWM chips may require the command signal in different patterns. Since all the paralleled modules have the same signal at the inputs of their respective second buffers, their command signals should be essentially the same, so that their output currents will also be about the same. The buffers 22a, 24a can comprise a simple gain or contain certain poles and zeros in their transfer function.

Figure 4:
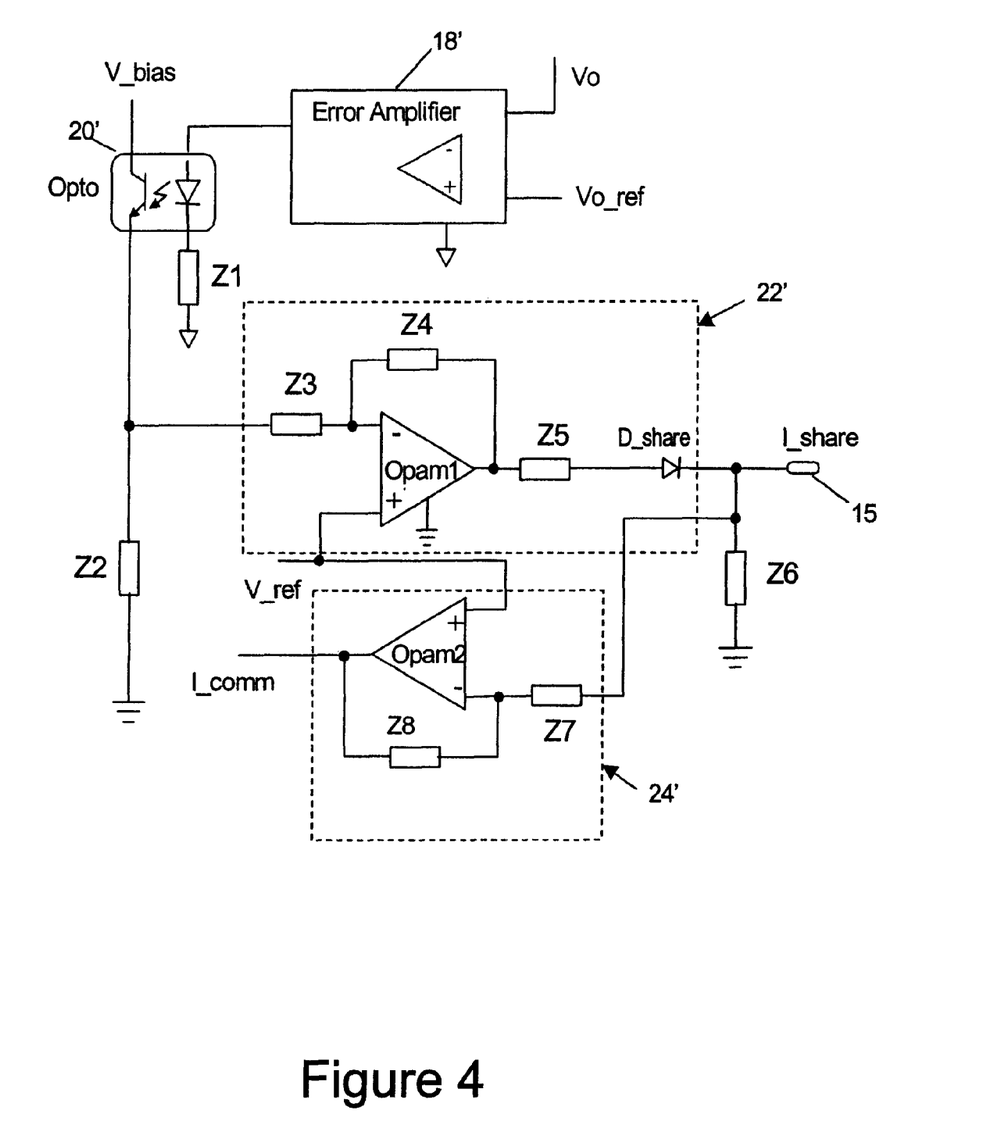
FIG. 4 illustrates one exemplary circuit of a current share scheme for paralleling multiple modules in accordance with the aspects of the present invention.

An example circuit implementation of one exemplary embodiment of the current share scheme for paralleling multiple modules in accordance with the aspects of the present invention is shown in FIG. 4. In this embodiment, isolation block comprises an optocoupler (Opto 20') and the first and second buffers 22', 24' are operational amplifiers (Opam_1 and Opam_2). Z1–Z9 are impedances that can be resistors, capacitors or the combination of both according to the design aspects of the particular circuit.

The output error amplifier 18' compares the feedback output voltage Vo with a reference voltage Vo_ref to adjust its output and drive the input of Opto 20'. The polarity shown in the figure is such that when Vo is higher than the reference Vo_ref. the output of the error amplifier 18' will move higher. With an increasing current in Opto 20', the voltage across Z2 will increase which leads to a decreasing "I_share" and increasing "I_comm"; "I_share" being the signal at the current share terminal for parallel operation of multiple modules and "I_comm" being the command signal to the following PWM controller 16.

The polarity of the error amplifier block 18' can be different based on different ways to implement error amplification as required by current control in different PWM controllers. For a different polarity, either the secondary or the primary connection of the Opto 20' can be rearranged to accommodate the difference.

Figure 6:
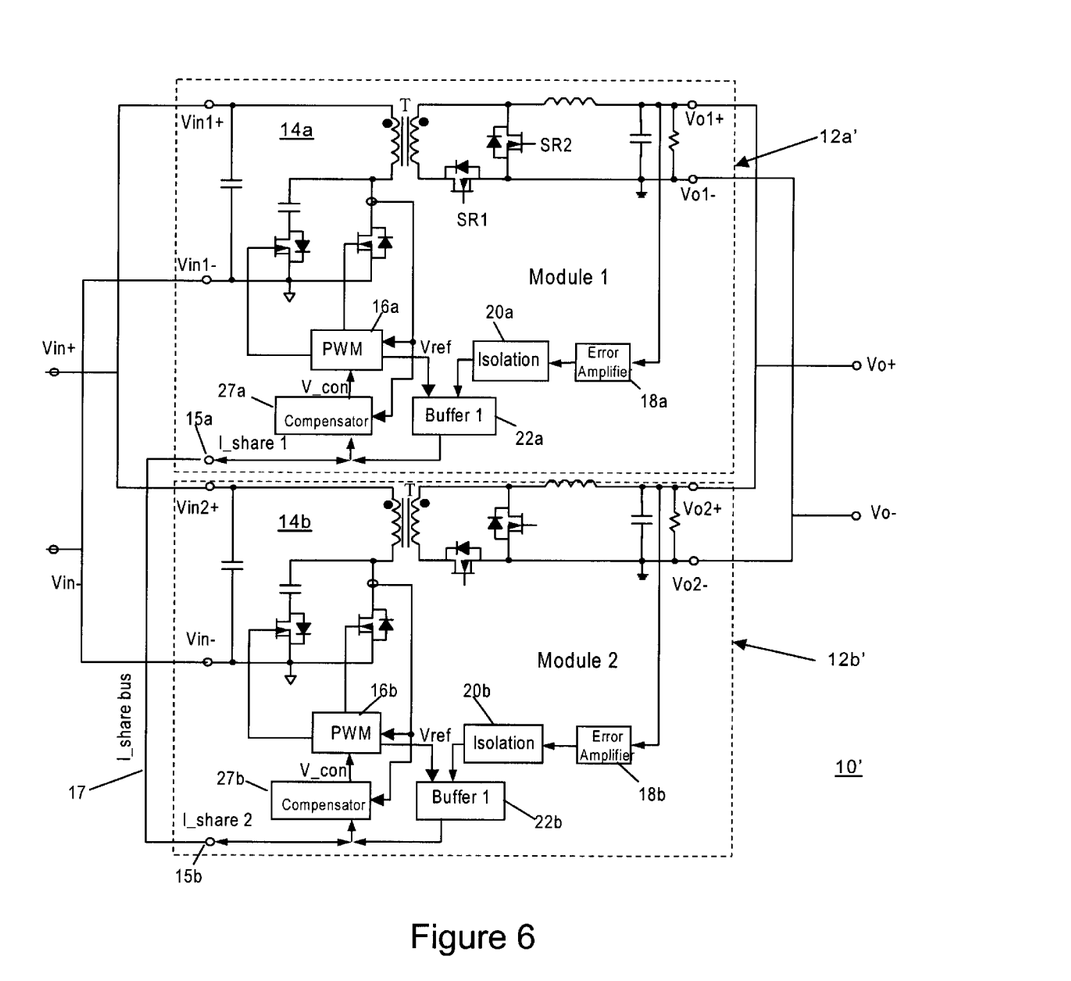
FIG. 6 is a functional block diagram of parallel modules with another current share scheme in accordance with the aspects of the present invention.

After the command signal goes through Opto 20' to the primary side, it is coupled to Opam_1 (first buffer 22'). The output of Opam_1 (buffer 22') is a current command related signal available to the module's I_share terminal 15. The signal at the I_share terminal 15, common to all modules in parallel, is then coupled to Opam_2 (buffer 24'). The output of Opam_2 (buffer 24') in each module is conditioned so that it can serve as the current command signal to the PWM controller 16. However, depending on the control logic of the PWM controller 16, Opam_2 (buffer 24') may not be needed and is, therefore, optional. The reference voltage for Opam_1 and Opam_2 (V_ref) can be generated from the V_bias or some other means such as the reference voltage from the PWM controller 16 as shown in FIGS. 2 and 6. In this example, a diode D_share makes the system a master-slave scheme with the highest I_share being used in all the paralleled modules.

Figure 5:
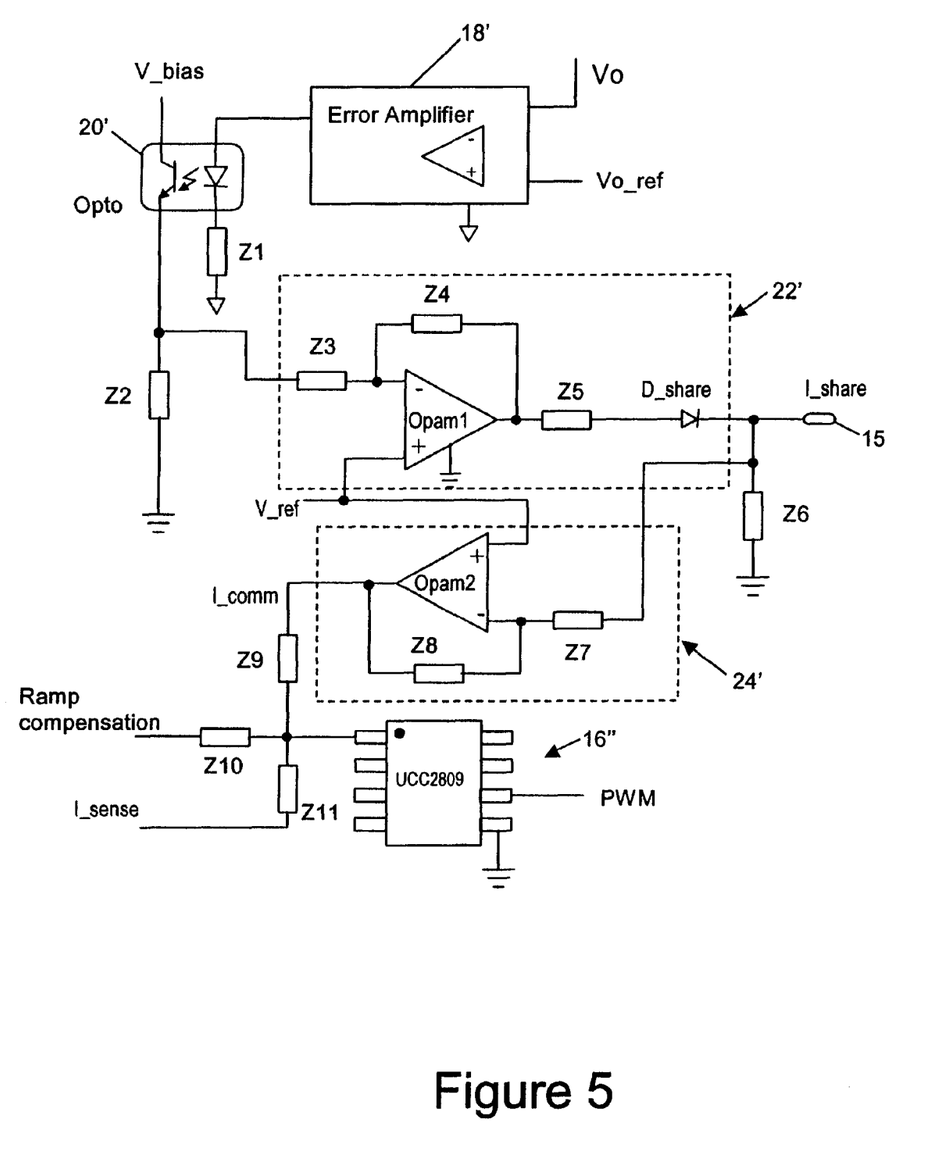
FIG. 5 illustrates another exemplary circuit of a current share scheme for paralleling multiple modules in accordance with the aspects of the present invention.

Turning now to FIG. 5, another exemplary circuit of a current share scheme for paralleling multiple modules in accordance with the aspects of the present invention is shown. In this exemplary circuit, the circuit components are the same as in FIG. 4 except that a PWM controller TI UCC2809 is shown. For this PWM controller 16", Opam_2 (buffer 24') is used so that the correct logic of I_comm is fed into pin 1 of the PWM controller 16. Since the voltage at the feedback pin (Pin 1) of UCC2809 is fixed to around 1V at the turn-off of the PWM signal, and the ramp compensation signal is also preprogrammed, the sum of the current command signal I_comm and the current sense signal I_sense have to be almost constant at the turn-off instant of gate drive signal. Therefore, modulating the current command signal I_comm through the current sharing circuit can directly control the current sense signal, and thus the output current of the converter module.

Turning now to FIG. 6, in another aspect of the invention, buffer 24 of FIG. 2 comprises a compensator 27a in module 12a', with module 12b' configured the same. Compensator 27a compares the signal at I_share terminal 15a with a sensed signal related to the output current. The compensator 27a may have a certain compensation function as required to control the output current in close-loop. The output V_con of the compensator 27a can be used as a current command as in FIG. 4 or FIG. 5. However, due to the closed loop control function of compensator 27a, V_con can also be used directly to modulate the duty cycle, e.g., if a voltage-mode PWM chip is used.

Figure 7:
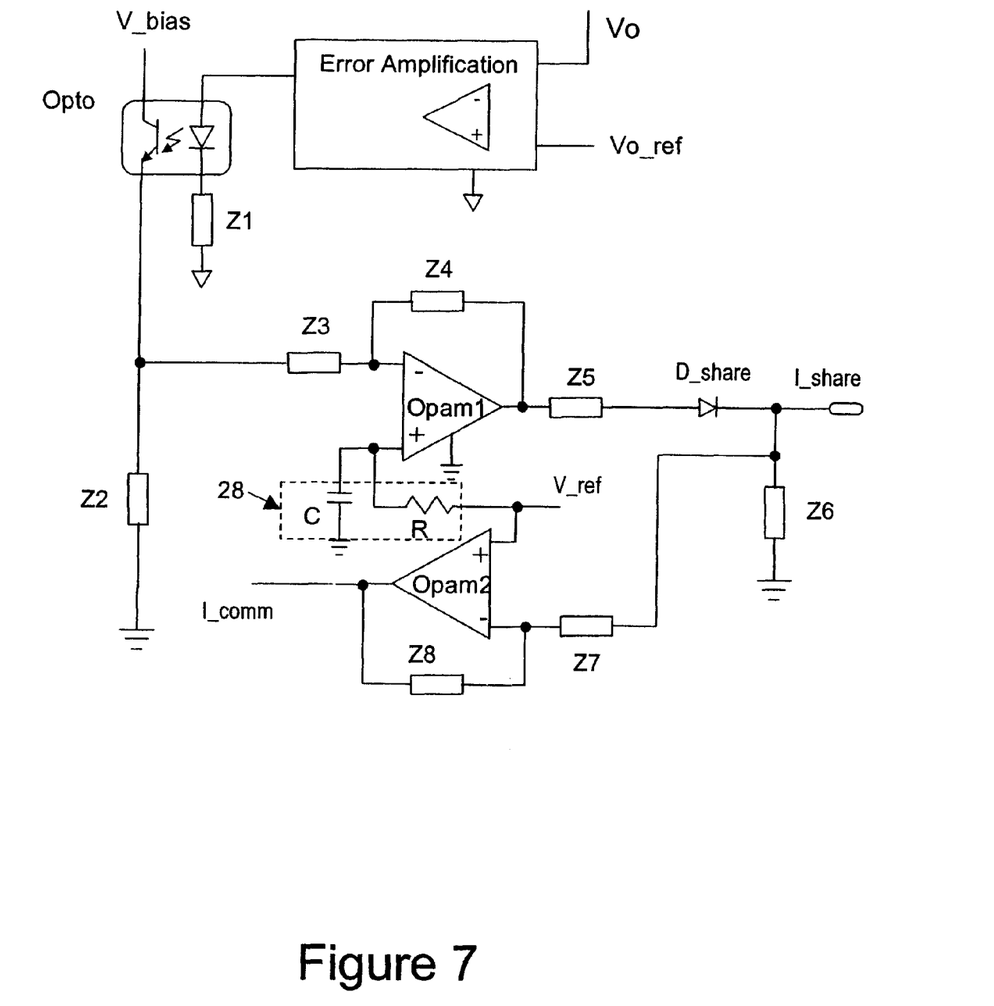
FIG. 7 illustrates an exemplary circuit of a current share scheme including a time delay for paralleling multiple modules in accordance with the aspects of the present invention.

Reference now will be made to FIG. 7. In "hot-plug-in" applications, when a module is plugged in, it may go through a start-up process while other paralleled modules are already in operation. It is important that this process will not cause too much disturbance to the output voltage. For the plugged-in module in the initial start-up process, its Opto current initially will be low before the output error amplifier establishes its operating point. Therefore, the voltage across Z2 will be low and I_share will be high. A high I_share will become the master signal commanding other modules in operation to boost the output current. As a result, the output voltage may have an overshoot spike. To avoid this undesired phenomenon, a time delay 28 can be introduced to the V_ref of Opam_1 so that I_share will not go high too quickly during the initial startup process. The delay can be implemented with a simple R-C as shown in FIG. 7 or other known means. This extra freedom could also help to improve the start-up performance of the single module operation. In the scheme shown in FIG. 6, similar function can be achieved by limiting the reference signal V_ref to the compensator 27a during the startup (current walk-in).

Accordingly, the invention provides a simple and effective solution to the problems in the art without sending signal across the isolation boundary with the current-share terminal at the input side and the voltage reference and the output error amplifier at the output side. All the paralleled modules are forced to follow the same current reference signal feeding into the PWM controller in each module.

An advantage of the present invention is its simplicity. However, one drawback is the possible saturation of all but one of the output error amplifiers will lead to certain transients when the controlling unit (one with its voltage loop in control) is switched in/out of the system (N+1 redundancy). With known anti-saturation mechanisms, proper allocation of control loop gain, and other specific means, the transient performance is acceptable in many applications.

Figure 8:
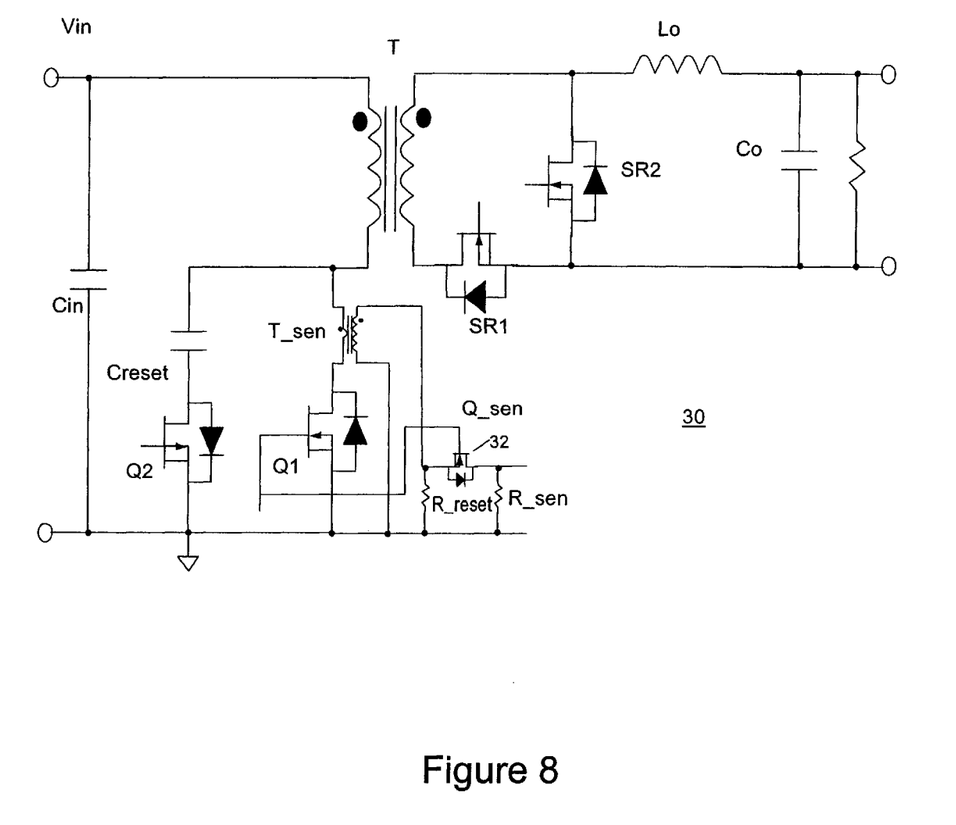
FIG. 8 shows a forward converter with a current sensing circuit in accordance with the aspects of the present invention.

In another aspect of the invention, a method and circuit is provided for current sensing. With reference to FIG. 8, the circuit 30 shown replaces the diode D_sen of the prior art (FIG. 1) with a switch 32 (Q_sen) controlled to operate with the main switch Q1 synchronously. An optional delay circuit, possibly consisting of a resistor, a capacitor, or a diode, can also be used to create certain delays between Q_sen's control signal and Q1's control signal, so that noise signals associated with the switching on and off of Q1 can be reduced or excluded from the output of the current sense circuit. Switch 32 is shown as a MOSFET switch. The gate of switch 32 is connected to the gate of Q1 directly. Alternately, the gate may be connected through some simple signal conditioning circuit such as a resistor, or a RC network so that the time difference between their gate signals can be used to optimize the performance, such as filtering out the spike of T_sen current at the turn-on of switch Q1, as known in the art. In this scheme, the switch 32 is controlled by the same gate signal (or a signal very close to the same gate signal if a signal conditioning circuit is used) of the main power switch Q1. Therefore, the sensed current, no matter whether it is positive or negative, will be able to go through R_sen when switch 32 is ON, avoiding the high voltage on R_reset when the switch current is negative.

Figure 9:
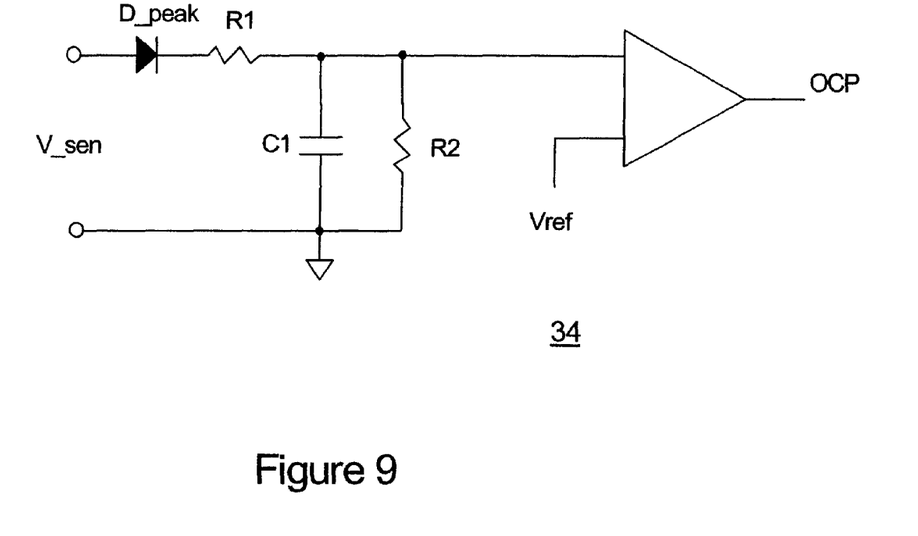
FIG. 9 shows a circuit diagram of an over-current protection circuit in accordance with the aspects of the present invention.

The above-sensed current can also be used to generate an over-current protection signal as shown in the circuitry 34 of FIG. 9. The sensed current information V_sen should have a waveform same as the current in the main switch Q1. This circuit 34 will react to the sensed peak current information. In many cases the contribution to V_sen from the magnetizing current of the power transformer is small enough comparing with the contribution from the current in the output filter inductor. In such cases, the protection set-point also well represents the output current. The diode D_peak will "sample and hold" the peak value of the current sense signal. Resistor R1 is significantly smaller than R2 so that the voltage on C1 after a certain switching cycles will be close to the peak of V_sen. R1 and C1 are optional. R1 can reduce the effect of the protection circuit on the current sense circuit, and also form a filter with C1 to eliminate any high frequency components in the sensed signal due to either turn-on current spikes or other noises. R2 is for discharging the voltage on C1 with a discharging rate slow enough not affecting the accuracy of the protection set-point. With the proper selection of parameters R1, R2 and C1, the voltage across C1 can fairly accurately represent a parameter of the converter, such as the output inductor current. The voltage on C1 will then be used to compare with a predefined voltage reference through an operational amplifier or a comparator whose output will change state as the sensed current information becomes greater than the predetermined value represented by Vref. The polarity of the two inputs to the OpAm or the Comparator is not labeled in the drawing and is determined by the need of the circuitry following it. The OCP signal can then be used to shut down the converter in various ways.

Figure 10:
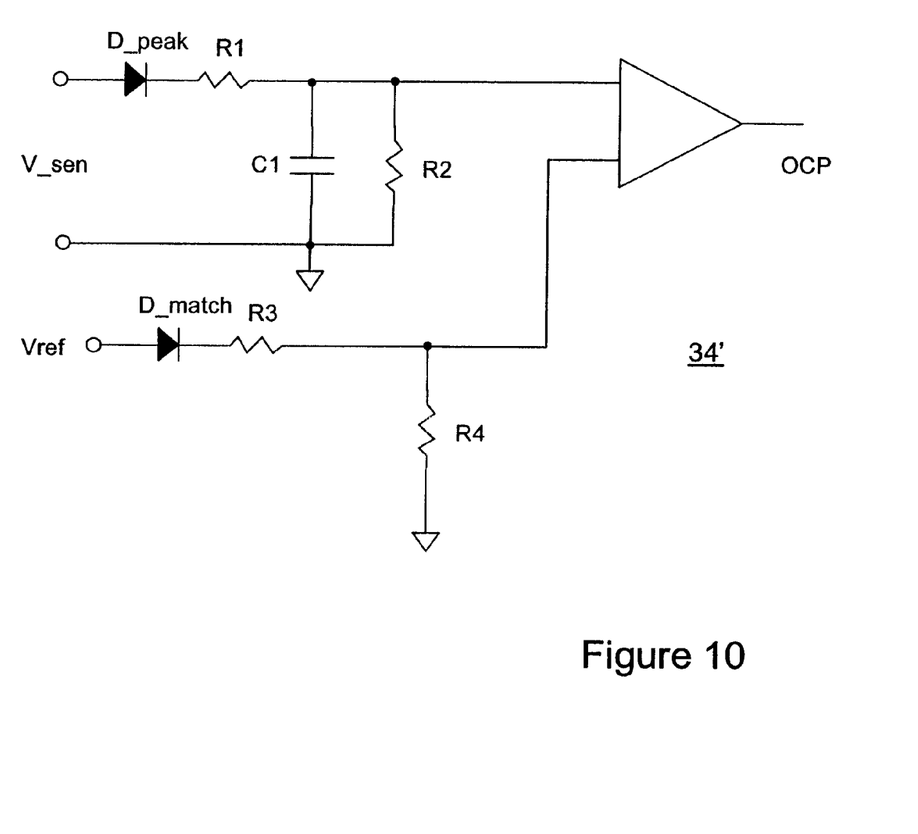
FIG. 10 shows a circuit diagram of another over-current protection circuit in accordance with the aspects of the present invention.

D_peak can also be implemented as a switch (e.g., MOSFET) controlled synchronously with the main switch. However, if it is implemented as a diode, its voltage drop is a function of temperature, and could take a significant portion of V_sen in practical use. To compensate this change for more accurate protection, another same type of diode can be added as shown in the circuitry 34' of FIG. 10. D_peak and D_match could be in one package, in close-by packages, or have certain thermal communication so their junction temperatures are not significantly different. The use of R3 and R4 is optional. They serve two purposes: (a) providing freedom to adjust the over-current set point without changing the V_sen magnitude that usually affects the control loop performance; (b) providing a bias current in D_match near the operating point of D_peak, so their voltage drops will be close under all conditions.

Depending on the requirement of the over-current protection, the output of the above circuitry can be used to either shut down the converter (option of latch or resume operation when the over-current condition is removed) or injecting a signal into the control loop so that the output voltage will decrease when the output current goes over the predetermined value—usually being referred to as constant power mode.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power distribution system comprising:
   a plurality of power converter modules each having a current sharing signal terminal on an input side and power output terminals on an output side, the corresponding power output terminals of the several modules being connected together and adapted to power a common load;
   an interconnecting signal bus coupled across the current sharing signal terminals on the input side;

a plurality of feedback circuits, each of which is associated with one of said modules, for comparing a feedback voltage on the output side of a respective power converter module with a reference voltage to provide an error signal to the input side of the respective power converter module; conditioning the error signal to provide a current command signal to said signal bus; and conditioning the current command signal to provide a control signal to drive a respective current supplied by the power converter modules.

2. The power distribution system of claim 1 wherein said feedback circuits further comprise isolation circuitry.

3. The power distribution system of claim 2 wherein said isolation circuitry is provided to electrically isolate the error signal from the input side.

4. The power distribution system of claim 3 wherein said isolation circuitry comprises an opto-isolator apparatus.

5. The power distribution system of claim 1 wherein each of the feedback circuits-further comprises an error amplifier.

6. The power distribution system of claim 5 wherein the error amplifier drives the input of an opto-isolator apparatus such that the error signal is electronically isolated from the input side.

7. The power distribution system of claim 1 wherein the error signal is conditioned by a first buffer to provide the current command signal.

8. The power distribution system of claim 7 wherein the first buffer comprises a first operational amplifier.

9. The power distribution system of claim 8 wherein an output of the first operational amplifier is the current command signal provided to the signal bus.

10. The power distribution system of claim 9 further comprising a diode serially coupled to the output of the first operational amplifier such that the highest current command signal of all power converter modules is provided to the signal bus.

11. The power distribution system of claim 10 wherein the diode results in a master-slave scheme for controlling the power converter modules.

12. The power distribution system of claim 8 wherein the first operational amplifier compares the error signal with a second reference voltage to provide the current command signal provided to the signal bus.

13. The power distribution system of claim 12 wherein the second reference voltage is generated from a bias voltage.

14. The power distribution system of claim 12 wherein the second reference voltage is generated from a reference voltage from a pulse-width modulated (PWM) controller.

15. The power distribution system of claim 12 wherein a time delay is introduced to the second reference voltage.

16. The power distribution system of claim 15 wherein the time delay is implemented as an R-C circuit.

17. The power distribution system of claim 7 further comprising a second buffer to condition the common current command signal from the signal bus.

18. The power distribution system of claim 17 wherein the second buffer comprises a second operational amplifier.

19. The power distribution system of claim 18 wherein an output of the second operational amplifier adjusts a control signal of the power converter module associated therewith.

20. The power distribution system of claim 19 wherein the power converter module is driven by a pulse-width modulated (PWM) controller having the output of the operational amplifier as an input thereto.

21. The power distribution system of claim 20 wherein the PWM controller further comprises a ramp compensation signal input and a current sense input thereto.

22. The power distribution system of claim 17 wherein the second buffer comprises a compensator that compares the common current command signal from the signal bus with a sensed signal related to output current.

23. The power distribution system of claim 22 wherein an output of the compensator adjusts a control signal of the power converter module associated therewith.

24. The power distribution system of claim 23 wherein the power converter module is controlled by a pulse-width modulated (PWM) controller having the output of the compensator as an input thereto.

25. The power distribution system of claim 24 wherein the PWM controller further comprises a ramp compensation signal input and a current sense input thereto.

26. The power distribution system of claim 22 wherein a time delay is introduced to a reference signal to the compensator.

27. The power distribution system of claim 1 wherein the power converter modules comprise standard DC-DC converter modules.

28. A current share circuit for power converters in parallel operation, the circuit comprising:
   an interconnecting signal bus coupled across current sharing signal terminals on an input side of said power converters;
   a plurality of feedback circuits, each of which is associated with one of said modules, for comparing a feedback voltage on the output side of a respective power converter module with a reference voltage to provide an error signal to the input side of the respective power converter module; conditioning the error signal to provide a current command signal to said signal bus; and conditioning the current command signal to provide a control signal to drive a respective current supplied by the power converter modules.

29. The current share circuit of claim 28 wherein the error signal is conditioned by a first operational amplifier to provide the current command signal to the signal bus as an output thereof.

30. The current share circuit of claim 29 further comprising a diode series coupled to the output of the first operational amplifier such that the highest current command signal of all power converters is provided to the signal bus.

31. The current share circuit of claim 29 further comprising a second buffer to condition the common current command signal from the signal bus.

32. The current share circuit of claim 31 wherein the power converter is controlled by a pulse width modulated (PWM) controller having an output of the second buffer an input thereto.

33. The current share circuit of claim 31 wherein the second buffer comprises a compensator that compares the common current command signal from the signal bus with a sensed signal related to output current.

34. The current share circuit of claim 28 further comprising isolation circuitry to electrically isolate the error signal from the input side.

35. The current share circuit of claim 28 wherein the power converters comprise standard DC-DC converter modules.

36. A method for current sharing in parallel operated power converters, the method comprising:
   interconnecting a signal bus across current sharing signal terminals on an input side of said power converters;
   providing a plurality of feedback circuits, each of which is associated with one of said converters, for comparing a feedback voltage on the output side of a respective power converter module with a reference voltage to provide an error signal to the input side of the respective power converter module; conditioning the error signal to provide a current command signal to said signal bus; and conditioning the current command signal to provide a control signal to drive a respective current supplied by the power converter modules.

37. The method for current sharing of claim 36 wherein the error signal is conditioned by a first operational amplifier to provide the current command signal to the signal bus as an output thereof.

38. The method for current sharing of claim 37 further comprising providing a second buffer to condition the common current command signal from the signal bus.

39. The method for current sharing of claim 38 wherein the power converter is controlled by a pulse-width modulated (PWM) controller having an output of the second buffer as an input thereto.

40. The method for current sharing of claim 38 wherein the second buffer comprises a compensator that compares the common current command signal from the signal bus with a sensed signal related to output current.

41. The method for current sharing of claim 37 further comprising providing a diode series coupled to the output of the first operational amplifier such that the highest current command signal of all power converters is provided to the signal bus.

42. The method for current sharing of claim 36 further comprising providing isolation circuitry to electrically isolate the error signal from the input side.

43. The current share method of claim 36 wherein the power converters comprise standard DC-DC converter modules.

* * * * *